United States Patent
Venturini

(10) Patent No.: US 9,823,029 B2
(45) Date of Patent: Nov. 21, 2017

(54) DEVICE FOR THERMAL SEPARATION BETWEEN A CONDITIONED ENVIRONMENT AND AT LEAST ONE EXTERNAL ENVIRONMENT

(71) Applicant: Franco Venturini, Farra di Soligo (IT)

(72) Inventor: Franco Venturini, Farra di Soligo (IT)

( * ) Notice: Subject to any disclaimer, the term of this patent is extended or adjusted under 35 U.S.C. 154(b) by 0 days.

(21) Appl. No.: 14/848,474

(22) Filed: Sep. 9, 2015

(65) Prior Publication Data
US 2016/0003562 A1    Jan. 7, 2016

Related U.S. Application Data

(62) Division of application No. 13/138,961, filed as application No. PCT/EP2010/056121 on May 5, 2010, now abandoned.

(51) Int. Cl.

| F28F 13/18 | (2006.01) |
|---|---|
| E04B 1/74 | (2006.01) |
| F24J 2/04 | (2006.01) |
| F24J 2/28 | (2006.01) |
| F24J 2/40 | (2006.01) |

(Continued)

(52) U.S. Cl.
CPC ............... *F28F 13/18* (2013.01); *E04B 1/74* (2013.01); *E04B 1/7608* (2013.01); *F24J 2/0444* (2013.01); *F24J 2/28* (2013.01); *F24J 2/407* (2013.01); *F24J 2/51* (2013.01); *Y02B 10/20* (2013.01); *Y02E 10/44* (2013.01)

(58) Field of Classification Search
CPC ...... E04B 1/74; E04B 2001/7695; E04B 1/76; E04B 1/7608; E04B 1/7612; E04B 1/90; E04B 1/88; E04B 1/762; E04B 1/7654; F24J 2/0444; F24J 2/28; F24J 2/407; F24J 2/51; E04D 13/1631; F28F 13/18
USPC ......................................................... 126/648
See application file for complete search history.

(56) References Cited

U.S. PATENT DOCUMENTS

| 3,863,621 A | 2/1975 | Schoenfelder |
| 4,267,822 A * | 5/1981 | Diamond ............... F24J 2/0438 126/563 |
| 5,561,958 A | 10/1996 | Clement et al. |

(Continued)

FOREIGN PATENT DOCUMENTS

| DE | 295 07 198 | 7/1995 |
| DE | 197 26 330 | 2/1999 |

(Continued)

*Primary Examiner* — Steven B McAllister
*Assistant Examiner* — Steven Anderson, II
(74) *Attorney, Agent, or Firm* — Rankin, Hill & Clark LLP

(57) ABSTRACT

A device for thermal separation between a conditioned environment and at least one external environment, which comprises a wall that has at least a first active layer-like region toward the conditioned environment, a second active layer-like region toward the external environment with respect to the first active layer-like region, a first insulating layer-like region, which is interposed between the active layer-like regions, a second insulating layer-like region, which is interposed between the second active layer-like region and the external environment. The active layer-like regions accommodate channels for the outflow of heat transfer fluids, which have, during the operation of the thermal separation device, temperatures that on average are different through the thickness of the wall.

19 Claims, 3 Drawing Sheets

(51) Int. Cl.
*F24J 2/51* (2006.01)
*E04B 1/76* (2006.01)

(56) References Cited

U.S. PATENT DOCUMENTS

| | | | |
|---|---|---|---|
| 5,931,157 A | 8/1999 | Aschauer | |
| 6,860,322 B1 | 3/2005 | Rylewski | |
| 7,077,124 B2 | 7/2006 | Szymocha | |
| 2005/0061312 A1 | 3/2005 | Szymocha | |
| 2009/0044465 A1 | 2/2009 | Krecke | |
| 2010/0186734 A1* | 7/2010 | Arndt | F24F 5/0075 126/629 |

FOREIGN PATENT DOCUMENTS

| | | | |
|---|---|---|---|
| DE | 10 2005 034970 | 1/2007 | |
| DK | 200800168 U1 * | 9/2008 | F24F 5/0075 |
| EP | 0 618 335 | 10/1994 | |
| FR | 2596438 | 10/1987 | |
| SU | 584075 | 12/1977 | |
| WO | 2005/008145 | 1/2005 | |

\* cited by examiner

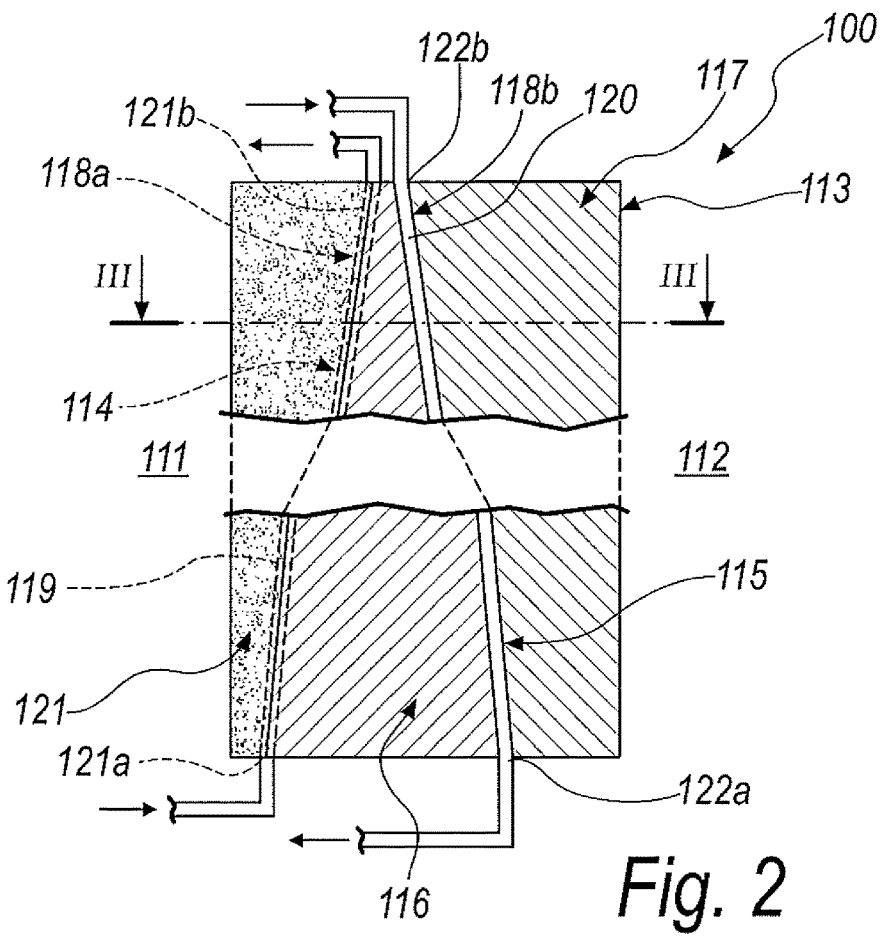
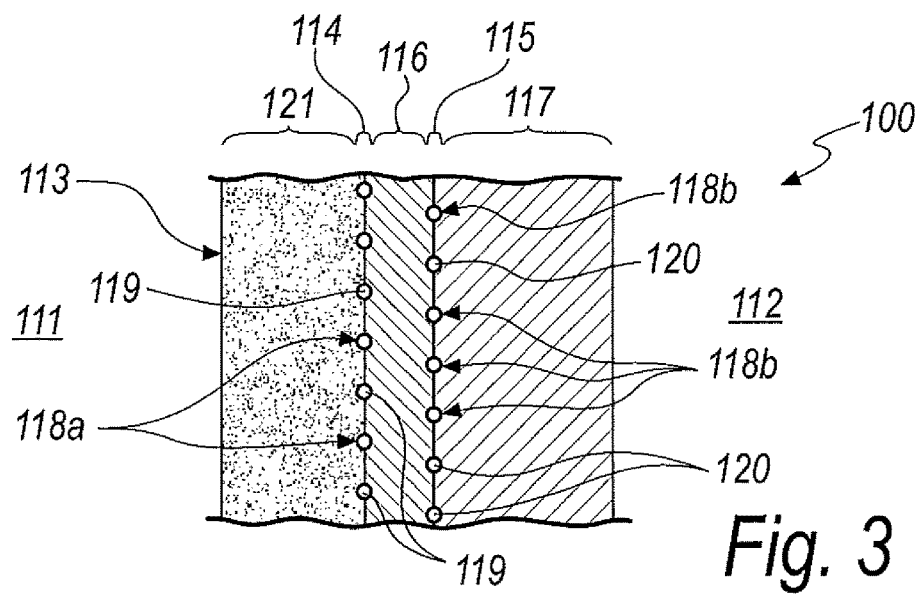

US 9,823,029 B2

DEVICE FOR THERMAL SEPARATION BETWEEN A CONDITIONED ENVIRONMENT AND AT LEAST ONE EXTERNAL ENVIRONMENT

The present invention relates to a device for thermal separation between a conditioned environment and at least one external environment.

BACKGROUND OF THE INVENTION

The need to contain energy consumption, particularly for summer and winter climate control of permanently occupied environments, such as offices and homes, is currently increasingly felt.

These needs are felt likewise in the field of the conditioning of production environments, cellars, refrigeration cells, rooms used for rearing animals or for farming, such as greenhouses and the like.

Currently, in order to meet these needs, wall structures are known in which there are pipes for the outflow of water or of another heat transfer fluid which define a layer at a temperature that is intermediate between the temperature of the conditioned environment enclosed by such walls and the outside.

The outflow water in these wall structures originates from heat sources at a temperature that is no longer useful for use in a technical process, such as for example water that originates from a geothermal well or from a thermal solar panel or that also exchanges heat with a heat transfer fluid used in an industrial process.

These wall structures, despite being appreciable, can be improved in many respects.

SUMMARY OF THE INVENTION

The aim of the present invention is to provide a thermal separation device that is adapted to maintain the temperature of a conditioned environment within selected temperature values, contrasting over time the tendency to thermal equilibrium between the conditioned environment and the outside, more effectively than currently known solutions.

Within this aim, an object of the invention is to propose a thermal separation device that is capable of exchanging heat with auxiliary heat sources.

Another object of the invention is to provide a thermal separation device that allows to use heat sources with energy that is technically waste energy, i.e., cannot be used usefully in the art, in order to maintain a thermal difference between the conditioned environment and the external environment.

Another object of the invention is to propose a thermal separation device that is structurally simple and easy to use and can be produced with relatively low costs.

This aim, as well as these and other objects that will become better apparent hereinafter, are achieved by a device for thermal separation between a conditioned environment and at least one environment that is external thereto, said environments being adjacent, characterized in that it comprises a wall that has at least a first active layer-like region toward said conditioned environment, a second active layer-like region toward said external environment with respect to said first active layer-like region, a first insulating layer-like region, which is interposed between said active layer-like regions, a second insulating layer-like region, which is interposed between said second active layer-like region and said external environment, said active layer-like regions accommodating channels for the outflow of heat transfer fluids, which have, during the operation of said thermal separation device, temperatures that on average are different through the thickness of said wall.

BRIEF DESCRIPTION OF THE DRAWINGS

Further characteristics and advantages of the invention will become better apparent from the following detailed description of two preferred but not exclusive embodiments of the thermal separation device according to the invention, illustrated by way of non-limiting examples in the accompanying drawings, wherein:

FIG. 2 is a transverse sectional view of the thermal separation device according to the invention in a second embodiment;

FIG. 3 is a sectional view, taken along the line III-Ill of FIG. 2, of the thermal separation device according to the invention in the second embodiment;

DESCRIPTION OF THE PREFERRED EMBODIMENTS

Figure 1:
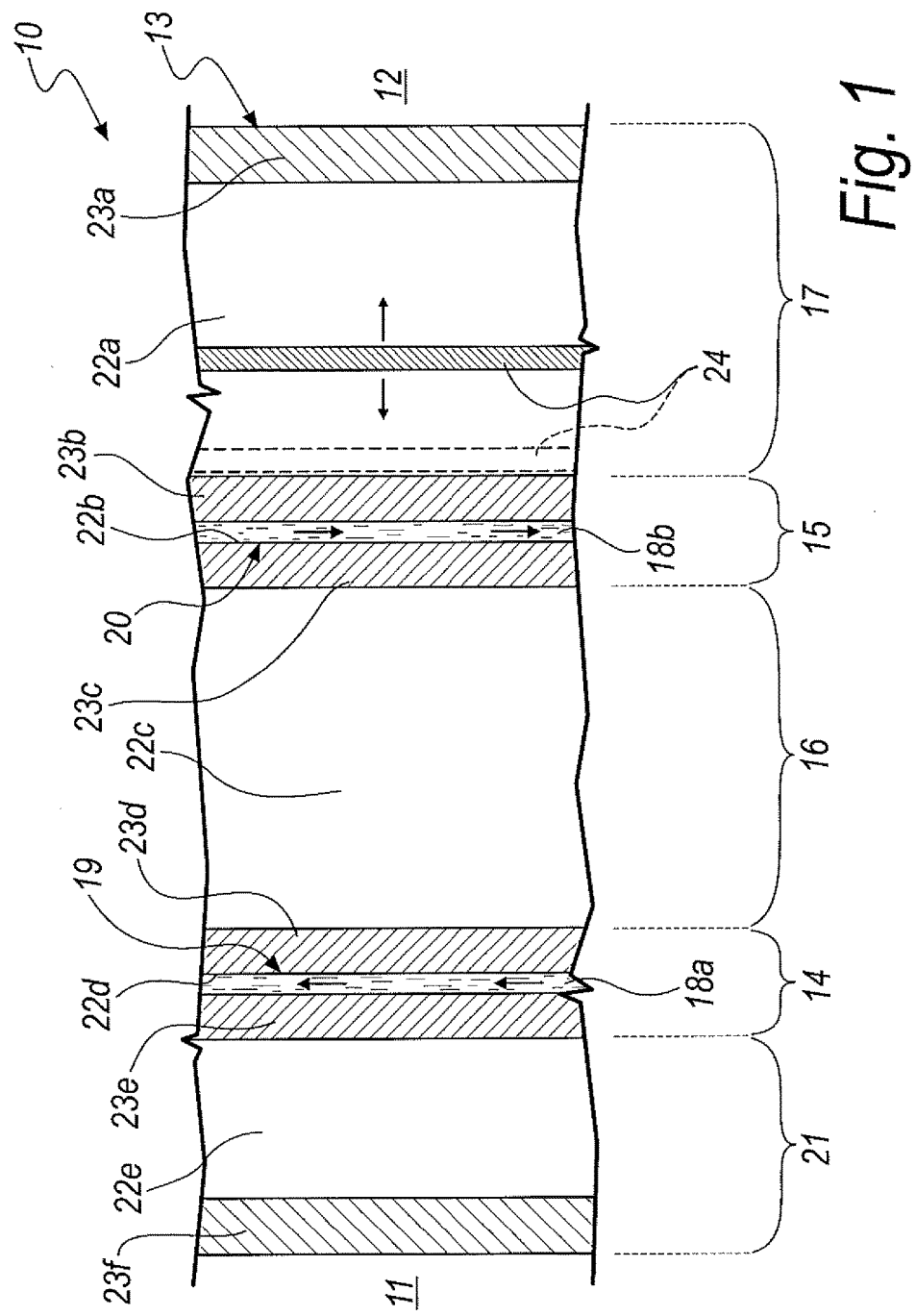
FIG. 1 is a transverse sectional view of a thermal separation device according to the invention in a first embodiment.

It is noted that anything found to be already known during the patenting process is understood not to be claimed and to be the subject of a disclaimer.

With reference to the figures, the reference numeral 10 generally designates a device for thermal separation between a conditioned environment 11 and at least one external environment 12.

According to the invention, the thermal separation device 10 according to the invention, in a first embodiment, comprises a transparent or translucent wall 13, which has a first active layer-like region 14, a second active layer-like region 15 toward the external environment 12 with respect to the first active layer-like region 14, a first insulating layer-like region 16, which is interposed between the active layer-like regions 14 and 15, a second insulating layer-like region 17, which is interposed between the second active layer-like region 15 and the external environment 12.

The active layer-like regions 14 and 15 accommodate respective channels 18a and 18b for the outflow of corresponding heat transfer fluids 19 and 20.

The heat transfer fluids 19 and 20 have, during the operation of the thermal separation device 10, temperatures that on average are different through the thickness of the wall 13.

Advantageously, the wall 13 of the thermal separation device 10 further has a third insulating layer-like region 21, which is interposed between the first active layer-like region 14 and the conditioned environment 11.

In the first embodiment, the insulating layer-like regions 16, 17 and 21 and the channels 18a and 18b are provided as interspaces 22a, 22b, 22c, 22d and 22e between substantially transparent or translucent panels 23a, 23b, 23c, 23d, 23e, 23f, which are conveniently made of glass.

In particular, of the panels 23a, 23b, 23c, 23d, 23e and 23f, preferably the first panel 23a and the second panel 23b define, by delimiting it, the first interspace 22a of the interspaces 22a, 22b, 22c, 22d and 22e, providing the second insulating layer-like region 17, the second panel 23b and the third panel 23c define, by delimiting it, the second interspace 22b of the interspaces 22a, 22b, 22c, 22d and 22e, providing the second active layer-like region 15, the third panel 23c and the fourth panel 23d define, by delimiting it, the third interspace 22c of the interspaces 22a, 22b, 22c, 22d and 22e, providing the first insulating layer-like region 16, the fourth panel 23d and the fifth panel 23e define, by delimiting it, the fourth interspace 22d of the interspaces 22a, 22b, 22c, 22d and 22e, providing the first active layer-like region 14, the fifth panel 23e and the sixth panel 23f define, by delimiting it, the fifth interspace 22e of the interspaces 22a, 22b, 22c, 22d and 22e, providing the third insulating layer-like region 21.

Conveniently, the channels 18a and 18b, i.e., respectively the fourth interspace 22d and the second interspace 22b, are crossed by the heat transfer fluids 19 and 20 so as to provide the known countercurrent configuration.

Moreover, depending on the contingent requirements of application of the thermal separation device 10 according to the invention, the heat transfer fluids 19 and 20 can be fluids that circulate in two distinct fluidic circuits, to which the channels 18a and 18b belong respectively, or the heat transfer fluids 19 and 20 can circulate in the same circuit of which the channels 18a and 18b constitute two different consecutive branches; the heat transfer fluids 19 and 20 are therefore the same fluid, differing substantially only in the thermal profile.

Moreover, advantageously there is an absorbent screen 24, which is or can be rendered opaque and during use is inserted in the first interspace 22a, means for repositioning the screen 24 in the first interspace 22a which are adapted to reposition on command the screen 24 between an intermediate position, in the first interspace 22a, and a position that adheres to the second panel 23b, in order to allow effective heat conduction between them.

For example, the screen 24 can be provided by means of a twin-roller curtain and can have a transparent portion and an opaque portion, which optionally is also reflective; such portions can be arranged alternately in the first interspace 22a by actuation of the rollers.

In particular, a region of transition between the opaque portion and the transparent portion can have a gradual transition from opacity to transparency.

In general, in any case, the screen 24 is absorbent, i.e., adapted to absorb the energy of solar radiation, which it captures and transmits in the form of heat to a heat accumulation device by means of the second heat transfer fluid 20.

An example of use of a thermal separation device 10, in the first embodiment, provides for the installation of the wall 13 so as to close a room of a dwelling space, providing for example a window or glazing; in this manner, the conditioned environment 11 is the environment inside the space and the environment that is external thereto is the outside environment 12.

In winter conditions, the internal temperature T1, i.e., the one desired for the conditioned environment 11, is higher than the external temperature T2, i.e., higher than the temperature of the outside environment 12.

The first fluid 19 of the heat transfer fluids 19 and 20, which conveniently is water, flows through the fourth interspace 22d, for example rising toward the upper part of the wall 13.

It exchanges heat with the conditioned environment 11 and with the second fluid 20 of the heat transfer fluids, which likewise conveniently is water which flows through the second interspace 22b, for example descending toward the lower portion of the wall 13.

The following are defined

T3 as the average inflow temperature of the first heat transfer fluid 19 into the fourth interspace 22d, and T4 as the average temperature at which it exits therefrom, T5 as the average inflow temperature of the second heat transfer fluid 20 into the second interspace 22b, and T6 as the average temperature at which it exits therefrom.

In general, advantageously T3>T4>T5>T6>T2.

Depending on the requirements of use, T1>T3 or T3>T1>T4.

In this second case, the heat flow exchanged by the first heat transfer fluid 19, in its outflow in the fourth interspace 22d, reverses its direction along the extension of the wall 13.

In summer conditions, the internal temperature T1, i.e., the temperature desired for the conditioned environment 11, is lower than the external temperature T2, i.e., the temperature of the outside environment 12.

In general, in this case advantageously T2>T6>T5>T4>T3>T1; it should be noted that in any case T3 is not necessarily greater than T1, but it is useful that T3 is close to T1, i.e., approximately equal to T1, and therefore T3 can also be slightly smaller than T1.

However, in the presence of significant incident solar flux values, in particular in situations in which the screen 24 assumes high solar absorption coefficient values, the temperature T6 can be higher than T2.

Conveniently, during the operation of the thermal separation device 10, the screen 24 can be arranged in use by interposing it between the first panel 23a and the second panel 23b, on command, or, if it is already interposed between them, likewise it can be rendered opaque.

Since therefore during use the screen 24 is opaque and interposed between the first panel 23a and the second panel 23b, it captures luminous radiation, which tends to heat it.

Thus, according to requirements, it can be arranged in such position which is intermediate with respect to the first interspace 22a, to the advantage of a lower heat transmission from it toward the second heat transfer fluid 20 with respect to the transmission that occurs when it is arranged in the position in which it adheres to the second panel 23b, as shown for example in dashed lines in FIG. 1.

It should be noted that the screen 24 can be arranged so as to adhere to the second panel 23b to transfer heat to the second heat transfer fluid 20 in order to conveniently convey the energy flow toward a heat accumulator which is external to the device 10.

In fact, when the screen 24 adheres to the second panel 23b during use, such screen, being heated by radiation, transmits a thermal flow to the second heat transfer fluid 20, by conduction through the second panel 22b.

Vice versa, the screen 24 during use can be conveniently spaced from the second panel 23b in order to limit heat transmission to the outside environment 12.

As an alternative, it can be arranged so as to adhere to the second panel 23b in order to transfer heat to the second heat transfer fluid 20.

Further, particularly in use in summer conditions, the screen 24 advantageously can be rendered reflective, for example because it is provided by means of a twin-roller curtain with a reflective portion that can be arranged in the first interspace 22a.

In this case, the reflective screen 24 reduces the thermal radiation flow that arrives from the outside environment 12 toward the conditioned environment 11.

In a second embodiment of the invention, a device 100 for thermal separation between a conditioned environment 111 and an external environment 112 comprises a wall 113 which has at least
a first active layer-like region 114,
a second active layer-like region 115, toward the external environment 112 with respect to the first active layer-like region 114,
a first insulating layer-like region 116, which is interposed between the active layer-like regions 114 and 115,
a second insulating layer-like region 117, which is interposed between the second active layer-like region and the outside environment 112.

The active layer-like regions 114 and 115 preferably accommodate channels 118a and 118b, which are conveniently provided by means of tubes, for the outflow of heat transfer fluids 119 and 120, which have, during the operation of the thermal separation device 100, temperatures that on average are different across the thickness of the wall 113.

The tubes that form the first channel 118a are preferably offset with respect to the tubes that form the second channel 118b.

Conveniently, in contact with the channels 118a and 118b there is a layer made of conducting material, such as an electrically welded metallic net or a perforated metallic panel, which are not shown in the accompanying figures, to the full advantage of greater structural strength of the thermal separation device 10, further allowing greater thermal uniformity, allowing a greater spacing of the consecutive pipes.

Advantageously, a third insulating layer-like region 121 is interposed between the first active layer-like region 114 and the conditioned environment 111.

The insulating layer-like regions 116, 117 and 121 conveniently are provided by means of insulating panels, made for example of expanded polyurethane or the like.

Depending on the contingent requirements of application of the thermal separation device 100 according to the invention,
the heat transfer fluids 119 and 120 can be fluids that circulate in two distinct fluidic circuits, to which the channels 118a and 118b belong respectively,
or the heat transfer fluids 119 and 120 can circulate in the same circuit of which the channels 118a and 118b constitute two different consecutive branches; the heat transfer fluids 119 and 120 are therefore the same fluid, differing substantially only in the thermal profile.

Conveniently, the second insulating layer-like region 117 and the third insulating layer-like region 121 have concordantly a thickness that increases in one direction of the channels 118a and 118b, the first insulating layer-like region having, in a manner that is discordant with respect to the second insulating layer-like region 117 and the third insulating layer-like region 121, a thickness that decreases in such longitudinal direction.

In a constructive variation of such second embodiment, the channels 118a and 118b advantageously are made of a transparent material, such as glass or transparent plastics.

As an alternative, such channels can be provided as gaps delimited by panels made of glass or other transparent material, in a manner similar to the first embodiment of the invention described herein.

At the same time, the insulating layer-like regions 116, 117 and 121 conveniently are made of insulating panels of transparent or semitransparent material, for example of the material known as Aerogel.

Figure 4:
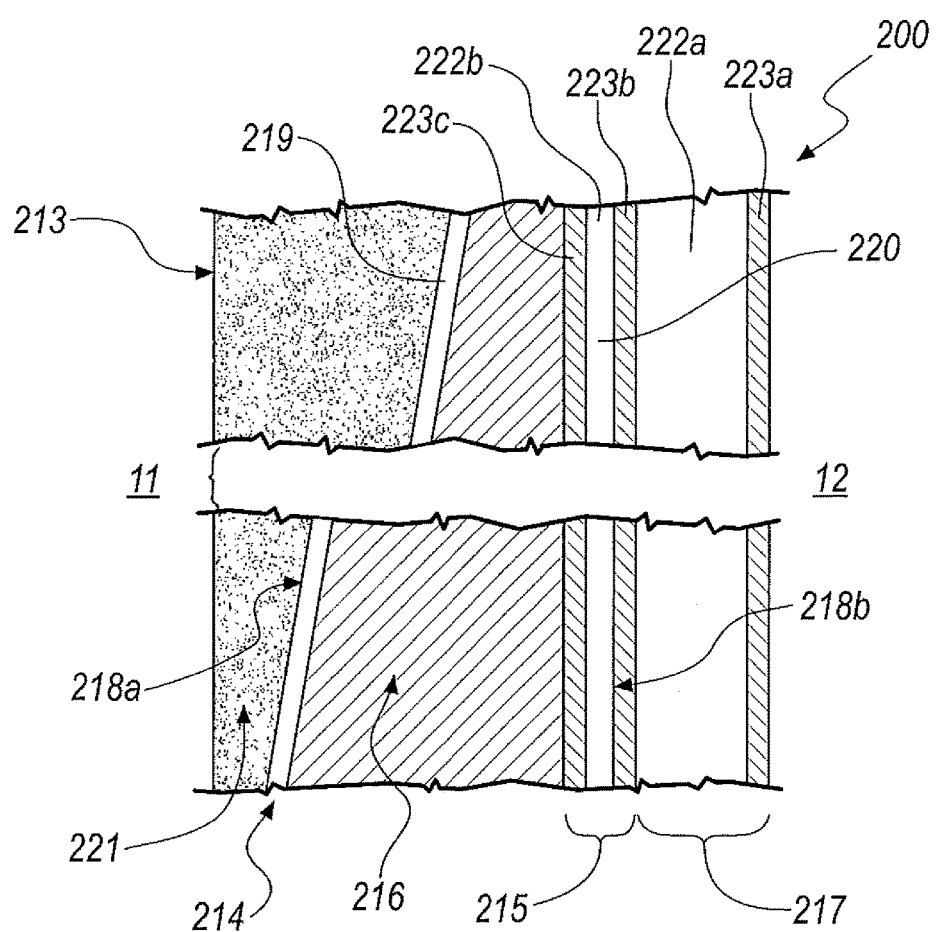
FIG. 4 is a transverse sectional view of the thermal separation device according to the invention in a third embodiment.

With particular reference to FIG. 4, a third embodiment of a thermal separation device according to the invention is described hereinafter and consists substantially of a combination of the first and second embodiments.

In the third embodiment, a device 200 for thermal separation between a conditioned environment 11 and an at least one external environment 12, according to the invention, comprises a transparent or translucent wall 213, which has
a first active layer-like region 214,
a second active layer-like region 215, toward the outside environment 12 with respect to the first active layer-like region 214,
a first insulating layer-like region 216, which is interposed between the active layer-like regions 214 and 215,
a second insulating layer-like region 217, which is interposed between the second active layer-like region 215 and the outside environment 12.

Advantageously, the wall 213 of the thermal separation device 200 further has a third insulating layer-like region 221, which is interposed between the first active layer-like region 214 and the conditioned environment 11.

The active layer-like regions 214 and 215 accommodate respective channels 218a and 218b for the outflow of corresponding heat transfer fluids 219 and 220.

The heat transfer fluids 219 and 220 have, during the operation of the thermal separation device 210, temperatures that on average are different across the thickness of the wall 213.

In the third embodiment, the second insulating layer-like region 217 and the first active layer-like region 215 are provided respectively as a first interspace 222a and a second interspace 222b, which are delimited respectively by panels 223a, 223b and 223c.

In particular, the first interspace 222a is limited by the first panel 223a and by the second panel 223b, the second interspace 222b being delimited by the second panel 223b and by the third panel 223c.

The second interspace 222b forms the second channels 218b.

The first insulating layer-like region 216 and the third insulating layer-like region 221 conveniently are provided by means of insulating and transparent or translucent panels, such as for example of a material known commercially as Aerogel.

The first channels 218a are conveniently provided by means of tubes.

Conveniently, the first insulating layer-like region 216 and the third insulating layer-like region 221 respectively have a fitness that decreases and increases in one longitudinal direction of the channels 218a and 218b.

Advantageously, at least one between the second panel 223b and the third panel 223c has solar radiation absorption properties.

As an alternative to this, it is possible to consider the use of a screen as already described in the first embodiment.

During the operation of the thermal separation device 100, the first fluid 119 of the heat transfer fluids 119 and 120 advantageously flows in the tubes that form a first one 118a of the channels 118a and 118b, which has, at a first end 121a, a first-end temperature T7 and has, at the second end 121b, a second-end temperature T8, which on average is different from the first-end temperature T7.

Thus, conveniently, during the operation of the thermal separation device 100, the second fluid 120 of the heat transfer fluids 119 and 120 advantageously flows in the tubes that form a first channel 118a of the channels 118a and 118b, which has, at a first end 122a, a first-end temperature T9 and has, at the second end 122b, a second-end temperature T10, which on average is different from the first-end temperature T9.

In this manner, for example in winter conditions, the operation of the thermal separation device 100 conveniently provides for the outflow of the first heat transfer fluid 119 through the first channel 118a from the first end 121a to the second end 121b with the first-end temperature T7 that is higher than the second-end temperature T8.

At the same time, in the outflow of the second heat transfer fluid 120 through the second channel 118b from the second end 122b to the first end 122a, the second-end temperature T10 is higher than the first-end temperature T9.

Advantageously, in the use of the wall 113 as a separation between the environment of a dwelling space and the outside, T11 is the inside temperature, i.e., the temperature desired for the conditioned environment 111, and T12 is the outside temperature, i.e., the temperature of the external environment 112.

In winter conditions, generally T11>T12, whereas in summer conditions T11<T12.

Advantageously, during the operation of the thermal separation device 100, T12>T8>T10>T8>T7>T11 is set in the summer condition.

It should be noted that T7 is not necessarily always higher than T11, but rather it is convenient for T7 to be close to T11, i.e., approximately equal to, or slightly greater than, T11.

However, in the presence of significant incident solar flux values, the temperature T9 can be higher than T12.

Differently, in the winter condition T7>T8>T10>T9>T12, since depending on the requirements of use T7>T11 or T7<T11.

In general, both in the first embodiment and in the second embodiment, the heat transfer fluids 19, 20, 119 and 120 are water, which conveniently exchanges heat with an external source, such as for example a source of renewable energy and/or a source of waste energy, where the expression "waste energy" is used to reference energy that otherwise cannot be used usefully in technical processes.

In particular, for example in the summer period, such water can originate from a water table that is at a temperature that is lower than the atmospheric temperature, i.e., than the outside environment 12, 112, or from an accumulator of heat that is used in the winter period, or can even exchange heat with them.

Likewise, such water, in the winter period, can originate from a geothermal site, from a seasonal heat accumulator, from a thermal solar panel, or can exchange heat with them, or can receive heat from an industrial plant during the processes of which heat that is not used otherwise is generated.

In practice it has been found that the invention achieves the intended aim and objects, providing a thermal separation device adapted to keep the temperature of a conditioned environment within selected temperature values, at the same time contrasting the tendency to thermal equilibrium between the conditioned environment and the outside more effectively than currently known solutions.

A thermal separation device according to the invention, thanks to its two active layer-like regions, in fact allows a thermal stratification of the wall, allowing to impose an advantageous thermal gradient across it, by means of the heat exchange with auxiliary sources of energy obtained with renewable methods or waste energy in the domestic or industrial user device.

Further, a thermal stratification device, according to the invention, allows effective accumulation of thermal energy by means of the synergistic effect of the outflow of fluid in the interspaces and of the opacity of the screen, which can be modulated and is aimed at modulating its heating by radiation.

The invention thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Application No. PD2009A000120 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A method for providing thermal separation between a conditioned environment and at least one environment that is external thereto, said environments being adjacent, the method comprising:
   providing a wall including
      a first active layer region arranged toward said conditioned environment with respect to a second active layer region, said first active layer regions accommodating a first channel for outflow of a first heat transfer fluid,
      said second active layer region arranged toward said external environment with respect to said first active layer region, said second active layer region accommodating a second channel for outflow of a second heat transfer fluid,
      a first insulating layer region, which is interposed between said first and second active layer regions, and
      a second insulating layer region, which is interposed between said second active layer region and said external environment,
   wherein said first and second active layer regions result in a thermal stratification of said wall, having a thermal gradient defined by:
   introducing the second heat transfer fluid into the second channel having an average inflow temperature (T5) lower than a temperature (T1) of the conditioned environment and higher than a temperature (T6) at which the second heat transfer fluid exits from the second channel when in winter conditions the temperature (T1) of the conditioned environment is higher than a temperature (T2) of the external environment, and wherein the temperature (T6) is higher than the temperature of the external environment (T2); and introducing the first heat transfer fluid into the first channel having an average inflow temperature (T3) lower than the temperature (T1) of the conditioned environment and lower than the temperature (T4) at which the first heat transfer fluid exits from the first channel when in summer conditions the temperature (T1) of the conditioned environment is lower than the temperature of the external environment (T2), wherein when the first heat transfer fluid and the second heat transfer fluid circulate in the same circuit of which said first and second channels constitute two different consecutive branches, in both winter and summer conditions the heat transfer fluids pass firstly through the first active layer region and then through the second active layer region.

2. The method for providing thermal separation according to claim 1, further comprising providing a third insulating layer region that is interposed between said first active layer region and said conditioned environment.

3. The method for providing thermal separation according to claim 1, comprising providing said insulating layer regions and said channels with interspaces between substantially transparent or translucent panels.

4. The method for providing thermal separation according to claim 3, further comprising providing an absorbent screen, which is opaque or can be rendered opaque and during use is inserted in said second insulating layer region, formed as an interspace between a first panel and a second panel of said transparent or translucent panels.

5. The method for providing thermal separation according to claim 4, further providing repositioning said absorbent screen in said second insulating layer region which are adapted to reposition on command said screen between an intermediate position in said interspace and a position that adheres to said second panel, said first panel delimiting said second active layer region toward said outside environment.

6. The method for providing thermal separation according to claim 2, further providing concordantly said second insulating layer region and said third insulating layer region with a thickness that increases in one direction of extension of said channels, the first insulating layer region having, discordantly with respect to said second insulating layer region and said third insulating layer region, a thickness that decreases in said direction of extension.

7. The method for providing thermal separation according to claim 1, further comprising providing said channels with tubes for the outflow of said first heat transfer fluid and said second heat transfer fluid.

8. The method for providing thermal separation according to claim 7, further comprising providing the tubes that form the first channel offset with respect to the tubes that form the second channel.

9. The method for providing thermal separation according to claim 1, wherein when the temperature (T1) of the conditioned environment is higher than a temperature of the external environment (T2), the temperature (T3) of the first heat transfer fluid at the entry of the first active layer region is higher than the temperature (T5) of the second heat transfer fluid at the entry of the second layer region.

10. The method for providing thermal separation according to claim 1, wherein when the temperature (T1) of the conditioned environment is lower than a temperature of the external environment (T2), the temperature (T3) of the first heat transfer fluid at the entry of the first active layer region is lower than the temperature (T5) of the fluid at the entry of the second layer region.

11. A method for providing thermal separation between a conditioned environment and at least one environment that is external thereto, said environments being adjacent, the method comprising:

providing a wall including a first active layer region arranged toward said conditioned environment with respect to a second active layer region, said first active layer regions accommodating a first channel for outflow of a first heat transfer fluid, said second active layer region arranged toward said external environment with respect to said first active layer region, said second active layer region accommodating a second channel for outflow of a second heat transfer fluid, a first insulating layer region, which is interposed between said first and second active layer regions, and a second insulating layer region, which is interposed between said second active layer region and said external environment, wherein said first and second active layer regions result in a thermal stratification of said wall, having a thermal gradient defined by:

introducing the second heat transfer fluid into the second channel having an average inflow temperature (T5) lower than a temperature (T1) of the conditioned environment and higher than a temperature (T6) at which the second heat transfer fluid exits from the second channel when in winter conditions the temperature (T1) of the conditioned environment is higher than a temperature (T2) of the external environment, and wherein the temperature (T6) is higher than the temperature of the external environment (T2); and in summer condition introducing the second heat transfer fluid into the second channel having an average inflow temperature (T5) lower than a temperature (T6) at which it exits therefrom, and the temperature (T3) of the first heat transfer fluid at the entry of the first active layer region is lower than the temperature (T5) of the second heat transfer fluid at the entry of the second layer region, wherein when the first heat transfer fluid and the second heat transfer fluid circulate in the same circuit of which said first and second channels constitute two different consecutive branches, in winter and in summer conditions the heat transfer fluids pass firstly through the first active layer region and then through the second active layer region.

12. The method for providing thermal separation according to claim 11, further comprising providing a third insulating layer region that is interposed between said first active layer region and said conditioned environment.

13. The method for providing thermal separation according to claim 11, comprising providing said insulating layer regions and said channels with interspaces between substantially transparent or translucent panels.

14. The method for providing thermal separation according to claim 13, further comprising providing an absorbent screen, which is opaque or can be rendered opaque and during use is inserted in said second insulating layer region, formed as an interspace between a first panel and a second panel of said transparent or translucent panels.

15. The method for providing thermal separation according to claim 14, further providing repositioning said absorbent screen in said second insulating layer region which are adapted to reposition on command said screen between an intermediate position in said interspace and a position that adheres to said second panel, said first panel delimiting said second active layer region toward said outside environment.

16. The method for providing thermal separation according to claim 12, further providing concordantly said second insulating layer region and said third insulating layer region with a thickness that increases in one direction of extension of said channels, the first insulating layer region having, discordantly with respect to said second insulating layer region and said third insulating layer region, a thickness that decreases in said direction of extension.

17. The method for providing thermal separation according to claim 11, further comprising providing said channels with tubes for the outflow of said first heat transfer fluid and said second heat transfer fluid.

18. The method for providing thermal separation according to claim 17, further comprising providing the tubes that form the first channel offset with respect to the tubes that form the second channel.

19. The method for providing thermal separation according to claim 11, wherein when the temperature (T1) of the conditioned environment is higher than a temperature of the external environment (T2), the temperature (T3) of the first heat transfer fluid at the entry of the first active layer region is higher than the temperature (T5) of the second heat transfer fluid at the entry of the second layer region.

* * * * *